United States Patent [19]

Mallary et al.

[11] Patent Number: 5,805,392
[45] Date of Patent: Sep. 8, 1998

[54] LAMINATED PLATED POLE PIECES FOR THIN FILM MAGNETIC TRANSDUCERS

[75] Inventors: Michael Mallary, Berlin; Kofi Gyasi, Northborough, both of Mass.

[73] Assignee: Quantum Corporation, Milpitas, Calif.

[21] Appl. No.: 777,236

[22] Filed: Dec. 30, 1996

[51] Int. Cl.$^6$ .............................. G11B 5/127; G11B 5/147
[52] U.S. Cl. ........................................... 360/113; 360/126
[58] Field of Search ...................................... 360/113, 126

[56] References Cited

U.S. PATENT DOCUMENTS

| 5,134,533 | 7/1992 | Friedrich et al. | 360/113 |
| 5,379,172 | 1/1995 | Liao | 360/113 |
| 5,537,278 | 7/1996 | Yaegashi et al. | 360/126 |
| 5,590,008 | 12/1996 | Tanabe et al. | 360/126 |

*Primary Examiner*—John H. Wolff
*Attorney, Agent, or Firm*—William J. Kubida; Debra A. Chun

[57] ABSTRACT

The pole pieces of a thin film head are formed by two thin film layers of the magnetic metal NiFe, each NiFe layer being about 20,000 angstroms thick. These two NiFe layers are separated by an electrically insulating layer of alumina ($Al_2O_3$), ceramic or NiFe oxide that is about 100 angstroms thick. In one embodiment, a hard-baked photoresist layer is formed only around the edges of the first NiFe layer, the electrically insulating layer is deposited over the top surface of the first NiFe layer and over the hard-baked photoresist layer, and the second NiFe layer is then deposited, thus providing a three-layer metal/insulator/metal pole piece wherein the hard baked photoresist blocks edge short circuiting between the two thin film NiFe layers. In another embodiment, edge short circuiting is minimized by allowing a small filament(s) of a high electrical resistance plating seed layer of NiFe to extend between the two NiFe thin film layers, the high resistance of these long and thin NiFe filaments being much greater than the resistance of the two NiFe thin film layers.

15 Claims, 3 Drawing Sheets

LAMINATED PLATED POLE PIECES FOR THIN FILM MAGNETIC TRANSDUCERS

BACKGROUND OF THE INVENTION

1. Field of the Invention

This invention relates to the field of magnetic recording. More specifically, this invention relates to thin film heads or data transducers that fly or move closely adjacent to the surface of magnetic recording media on which a magnetic bit pattern is to be written by the head, or which contains a previously written magnetic bit pattern that is to be read by the head. This invention relates to laminated and plated yokes, poles, or pole pieces that form the data transducing magnetic structure of a thin film head.

2. Description of the Related Art

Thin film magnetic heads are generally known in the art. An article entitled NEXT-GENERATION POLE MATERIALS FOR MAGNETIC RECORDING HEADS, pages 61–66 of the publication DATA STORAGE, September 1996, describes thin film heads. An article entitled MR READ HEADS FOR TAPE DRIVES at pages 71–76 of that same publication describes MR heads.

U.S. Pat. No. 5,493,464, to Koshikawa, incorporated herein by reference, describes a sharing type thin film magnetic transducer that includes an inductive write head and an MR read head within one unitary assembly. This device is made up of three pole pieces, the intermediate one of which is shared by a read gap and by a write gap. The pole pieces of this head are not laminated.

A valuable utility of the present invention is to form one or more of the pole pieces of such a sharing type thin film magnetic transducer; for example the shared pole piece, as laminated pole pieces that are constructed and arranged in accordance with the present invention.

Laminated pole piece thin film heads are known wherein adjacent magnetic pole laminations or layers are not separated by an electrically insulating layer as is required by the present invention. Examples are U.S. Pat. No. 5,379,172 to Liao, U.S. Pat. No. 5,264,981 to Campbell, U.S. Pat. No. 4,190,872 to Jones et al, U.S. Pat. No. 4,610,935 to Kumasaka et al, U.S. Pat. No. 4,748,089 to Kumasaka et al; and (4) European Patent Application 0247868 to Kobayashi et al.

It is known that the high frequency magnetic permeability of electrically conductive pole pieces that are within a thin film data transducer is enhanced by limiting the pole piece material thickness to be less than about two times the material's electrical current skin depth at the transducer's operating frequency. By way of example, it is known that at an operating frequency of about 50 mega hertz, the skin depth of an nickel/iron (NiFe) pole piece is about 7000 angstroms.

However, for thin film heads having NiFe yokes, poles or pole pieces, this ideally thin situation requires the NiFe pole pieces be prohibitively thin, for example only somewhat greater than about 14000 angstroms for an operating frequency of about 50 mega hertz. These thin pole pieces, however, provide inadequate conductance of the read or write magnetic flux that is required to flow within the pole pieces.

A solution to this inadequate magnetic flux conduction problem is to laminate the NiFe pole pieces, so as to provide at least two magnetic layers for each pole piece, wherein the two magnetic layers are separated by an electrically insulating layer. To date, the use of laminated pole pieces has been plagued by electrical short circuits that occur between the two adjacent magnetic layers during manufacture of the laminated pole pieces.

By way of example, this lamination short circuiting problem occurs due to side wall redeposition that occurs on the magnetic layers during an ion milling process that is conventionally used to remove a plating seed layer upon which a top magnetic layer has been plated or deposited. This electrically conductive shorting circuit path of redeposited plating seed material is generally quite thin but it is usually greater than about 30 angstroms thick. As a result, this redeposited plating seed path constitutes a relatively low resistance path that provides for the undesirable conduction of eddy currents between the two magnetic layers. This eddy current flow operates to defeat the initial purpose of providing two thin laminated magnetic layers, in that the two layers operate as a single thicker layer in the presence of this eddy current flow.

The need remains in the art for apparatus and/or methods that enable the manufacture and subsequent use of laminated yokes, poles or pole pieces within thin film magnetic MR heads, thin film inductive heads, thin film shared heads, and thin film shared MR/inductive heads, wherein eddy current flow between the magnetic layers of the laminated yokes, poles or pole pieces is eliminated, or at least greatly reduced. More specifically, the need remains in the art for a new and unusual head manufacturing process, and resulting head structure, that enables the head to operate at high frequencies with the advantages that are provided by thin film electrically conductive pole pieces whose individual magnetic thin film thickness is limited to be only somewhat greater than twice the pole material's electrical current skin depth at the head's operating frequency.

SUMMARY OF THE INVENTION

In accordance with this invention, apparatus/methods are provided for producing or manufacturing laminated-pole-piece, thin film, magnet heads. This invention enhances the high frequency performance of thin film heads, including MR thin film heads, inductive thin film heads, and combination MR/inductive thin film heads.

As used herein the term thin film or magnetic metal thin film is intended to mean a thin layer that is generally in the range of from about 100 angstroms (A) to about 50,000 A thick.

In a preferred embodiment of the invention, at least one pole piece of a thin film head was formed of two thin film layers of a magnetic material, such as NiFe or more specifically $Ni_{81}Fe_{19}$, wherein each magnetic material layer was about 20,000 A thick, and wherein these two magnetic material layers were separated by an intermediate electrically insulating layer, such as a ceramic, an oxide of NiFe, or alumina ($Al_2O_3$), that was about 100 A thick.

As used herein, the term thin film head is intended to mean a single track or a multiple track, read head, write head, or combination read/write head, inductive head, or MR head, having at least one thin film magnetic flux path circuit that is formed of a magnetic metal by way of known photolithography and thin film plating techniques.

In a write inductive head, the magnetic flux that flows in the magnetic metal circuit path is induced by a write current that flows through a coil that is associated with the magnetic flux path. The magnetic flux path includes a write gap that is located closely adjacent to magnetic recording media that moves relative to the head. At the location of this write gap, magnetic flux bridges the write gap and fringes so as to pass through the recording media, thereby recording a magnetic bit in the recording media.

In a read inductive head, the magnetic flux that flows in the magnetic metal circuit path is induced by the fringe magnetic field that is generated by a magnetic bit pattern that is carried by magnetic recording media that moves relative to the closely adjacent read gap. This fringe magnetic flux passes through the head's magnetic flux path and operates to induce a current in a read coil that is associated with the magnetic flux path.

In an MR read head, a structure that is functionally similar to the above-described inductive read head is provided. However, in this case the magnetic metal circuit path is associated with an MR element; i.e., an element whose resistance changes in the presence of magnetic flux. Magnetic flux that flows through the magnetic circuit path influences the resistance of the MR element, and this resistance change enables the reading of the magnetic recording media's bit pattern.

This invention provides for the more reliable manufacture of laminated thin film head yokes, poles, or pole pieces by means of a magnetic material layering construction and arrangement that prevents low resistance electrical short circuits from forming between the adjacent and electrically insulated magnetic metal layers of the pole pieces. More specifically, the present invention operates to prevent electrical short circuits from forming at the edges of the adjacent magnetic metal layers of a laminated pole piece.

In one embodiment of the invention, a first thin film magnetic layer, about 20,000 A thick, is formed using conventional deposition processes. A relatively thick and hard-baked photoresist layer (i.e., baked at about 265 degrees C., so as to render the photoresist a permanent part of the head) is then selectively formed only around the boarder or edges of this first magnetic layer, thus leaving a major portion of the top surface of the first magnetic layer exposed. An alumina electrically insulating layer is then sputter deposited over the top surface of the first magnetic layer and over the hard-baked photoresist layer. This is followed by the sputter deposition of a very thin plating seed layer, for example, NiFe. A second magnetic thin film layer is then electro-deposited on the plating seed layer, using the same conventional processes as were used in depositing the first magnetic layer.

In this four-layer metal/insulator/seed/metal construction and arrangement, the hard baked photoresist layer that is located intermediate the first and second magnetic layers, but only around the outer edge or boarder of the first magnetic layer, results in blocking edge short circuiting between the two thin film metal layers during a subsequent ion beam etching process that is used in a well known manner to remove the plating seed layer from the region that are not occupied by the top metal layer; i.e., by the top pole member.

In another embodiment of the invention, edge short circuiting is minimized between the two magnetic metal thin film layers by a construction and arrangement wherein edge disposed eddy currents are reduced to an insignificant magnitude by allowing a small residue or filament of the plating seed layer (NiFe) to extend between the lower or first magnetic layer and the top or second magnetic layer. This filament, or filaments, of residual plating seed layer is long and thin. As a result, the electrical resistance of the filament(s) is much greater than the electrical resistance of the two magnetic metal layers. Eddy currents are therefore reduced by a large factor as a result of the high resistance of the long and thin plating seed layer filament(s).

More specifically, in this second embodiment, the edges of the second or top magnetic thin film layer are horizontally set back or positioned from the corresponding underlying edges of the first or bottom magnetic thin film layer by a greater distance than is conventional. As is well known, plating seed layers are used to facilitate the plating of both the first and second magnetic layer. In accordance with this embodiment of the invention, a plating seed layer is left in place in the vicinity of the first and second plated layers or laminations, after plating the top magnetic layer. While it is true that this residual plating seed layer may provide a degree of electrical conductivity between the first and second magnetic layers, the resistance of this residual plating seed layer circuits is very high, and flow of any significant amount of electrical eddy currents between the first and second magnetic layer is prevented by this high resistance.

In accordance with preferred embodiments of the invention, the first or bottom magnetic metal thin film layer may carry a thin Nickel/Iron oxide layer, about—100 A thick in place of the above described $Al_2O_3$ or ceramic layer, this Nickel/Iron oxide layer being deposited using an oxygen plasma ash process.

The apparatus/methods of this invention not only enables the use of very thin electrical insulating or ceramic layers between two adjacent magnetic thin film layers, but in addition, adequate electrical isolation may be provided by the native Nickel-Iron oxide layer that is on the top surface of the first or bottom magnetic thin film layer.

The present invention contemplates that the above-described first and second magnetic metal thin film layers, as well as the above-described plating seed layer, that are within the head's poles or pole pieces comprise a ferromagnetic material, and preferably an alloy of nickel and iron, such as NiFe. This metal alloy NiFe is known as having high magnetic permeability. An example is the brand Permalloy that comprises about $Ni_{78.5}$ and about $Fe_{22.5}$.

These and other objects, advantages and features of the present invention will be apparent to those of skill in the art upon reference to the following detailed description, which description makes reference to the drawing.

DESCRIPTION OF THE PREFERRED EMBODIMENT

Figure 1:
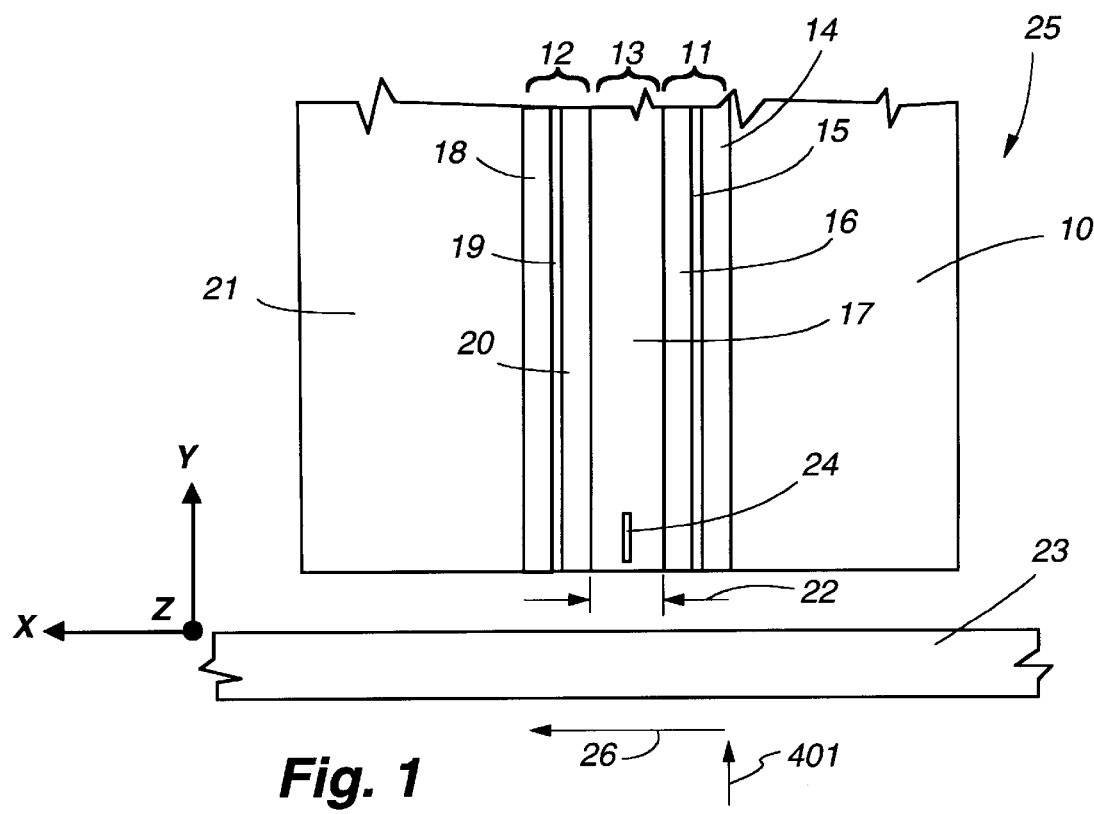
FIG. 1 is a side section view of an MR read head wherein both pole pieces are laminated in accordance with the invention.

FIG. 1 provides a simplified showing of an MR head 25 that includes the present invention. In this figure, a magnetic flux ferromagnetic metal circuit path is provided by a first pole piece 11, and a second pole piece 12. The two pole pieces 11,12 are spaced from each other by way of a nonmagnetic and dielectric layer 13, so as to form a read or transducing gap 22.

Gap 13 includes a well-known MR element 24. Relative movement 26 is provided between MR head 25 and magnetic recording media 23, for example the planar top surface of a floppy disk 23.

Head 25 also includes a substrate member 10 and an encapsulant member 21 of well-known construction and arrangement. In accordance with the present invention, the two pole pieces 11,12 are each formed a laminated construction. More specifically, pole piece 11 comprises (1) a gap-adjacent magnetic metal layer 16, (2) an intermediate electrically insulating and dielectric layer 15, and (3) an outer magnetic metal layer 14. Likewise, pole piece 12 comprises, (1) a gap-adjacent magnetic metal layer 20, (2) an intermediate electrically insulating and dielectric layer 19, and (3) an outer magnetic metal layer 18. In a preferred embodiment of the invention, layers 14,16,20,18 are formed of the same material, preferably NiFe, and layers 15,19 are formed from the same material, preferably alumina.

Figure 2:
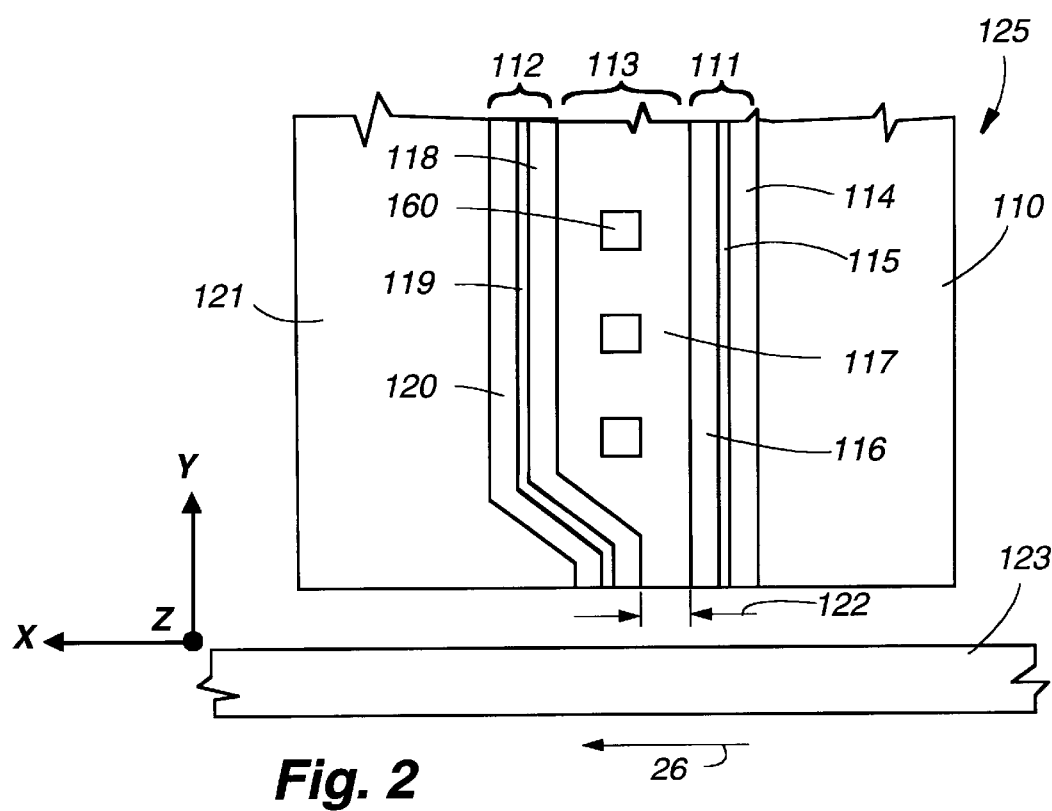
FIG. 2 is a side section view of an inductive read or write head wherein both pole pieces are laminated in accordance with the invention.

FIG. 2 provides a simplified showing of an inductive head 125 that includes the present invention. In this figure, a magnetic metal circuit path is provided by a first pole piece 111 and a second pole piece 112. The two pole pieces 111,112 are spaced from each other by way of a nonmagnetic and dielectric layer 113 and a transducing gap 122. A coil 160 is associated with the magnetic flux circuit that includes pole pieces 111,112. Relative movement 26 is provided between inductive head 125 and magnetic recording media, for example the top planar surface of an elongated magnetic recording tape 123.

As with head 25 of FIG. 1, head 125 includes a conventional substrate member 110 and an encapsulant 121. . In accordance with the present invention, the two pole pieces 111,112 are each formed a laminated construction. More specifically, pole piece 111 comprises (1) a gap-adjacent magnetic metal layer 116, (2) an intermediate electrically insulating and dielectric layer 115, and (3) an outer magnetic metal layer 114. Likewise, pole piece 112 comprises, (1) a gap-adjacent magnetic metal layer 118, (2) an intermediate electrically insulating and dielectric layer 119, and (3) an outer magnetic metal layer 120. In a preferred embodiment of the invention, layers 114,116,118,120, are formed of the same material, preferably NiFe, and layers 115,119 are formed from the same material, preferably alumina.

Figure 3:
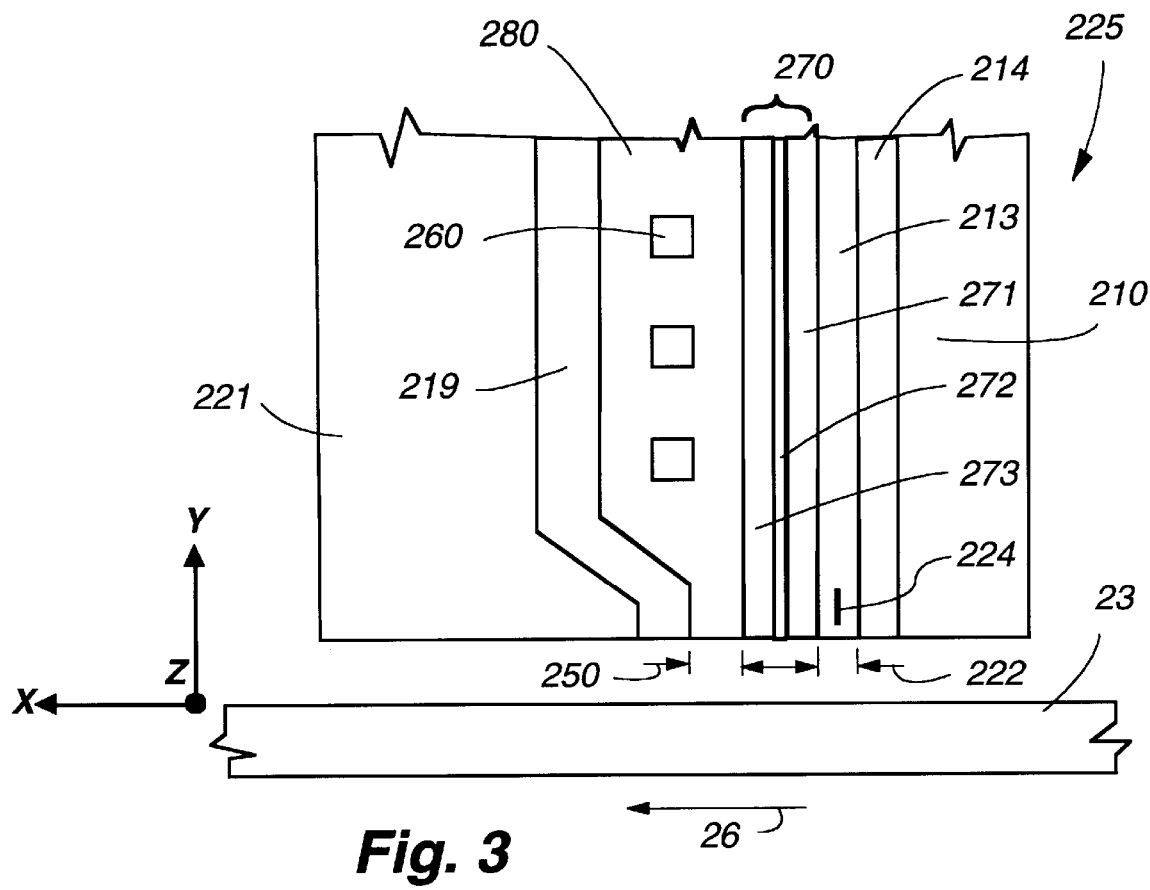
FIG. 3 is a side section view of a combined MR read head and inductive write head wherein only the middle, intermediate, or shared pole piece is laminated accordance with the invention.

FIG. 3 provides a simplified showing of a combination head 225 having a pole-sharing inductive write gap 250, and a pole-sharing MR read gap.222 In head 225, only the center or intermediate shared pole piece 270 is constructed and arranged in accordance with this invention. However, it is to be noted that all three pole pieces of head 225, or any two pole pieces of head 225, or any one pole piece of head 225, can be laminated in accordance with the spirit and scope of the present invention.

The FIG. 3 construction and arrangement provides a read gap associated, magnetic metal, pole piece 214, preferable formed of Permalloy, and a write gap, associated, magnetic metal, pole piece 219, again preferably formed of Permalloy. In the head 225, as shown in FIG. 3, the two pole pieces 214,219 are not laminated. A head of the FIG. 3 type can be used, for example, in a read-after-write environment.

An intermediately located and shared pole piece 270 is laminated in accordance with this invention, so as to have (1) a read-gap-adjacent magnetic metal layer 271, (2) an intermediate electrically insulating and dielectric layer 272, and (3) a write-gap-adjacent magnetic metal layer 273. In a preferred embodiment of the invention, layers 271,273 are formed of the same material, preferably NiFe, and layer 272 is formed of alumina.

Figure 4:
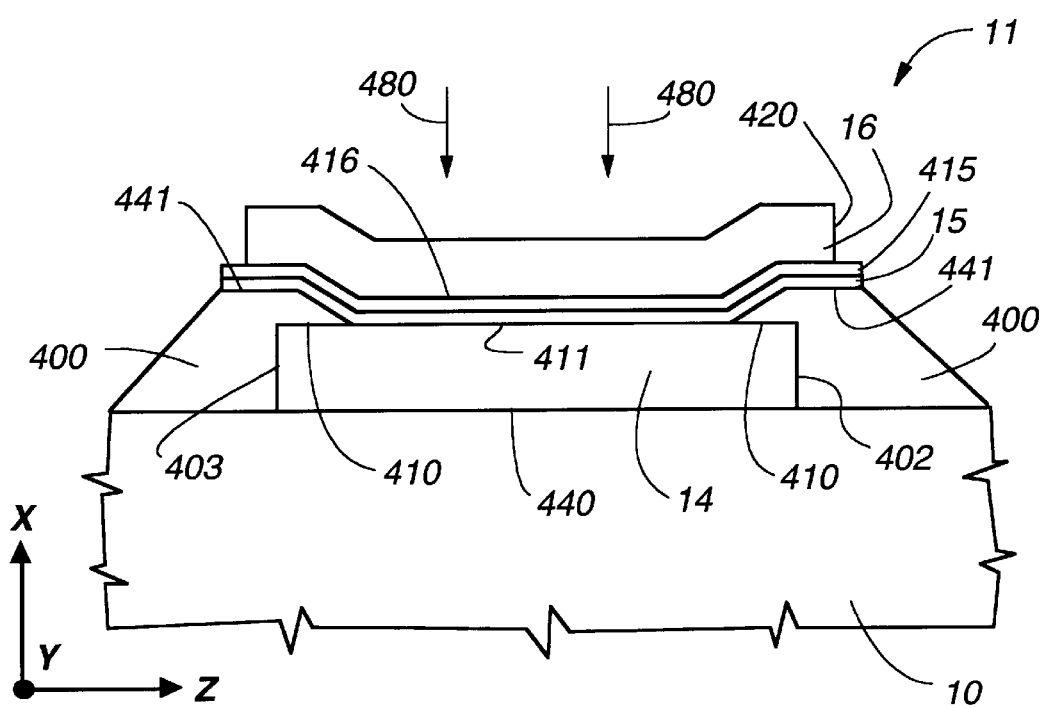
FIG. 4 is an enlarged air bearing surface (ABS) view (see arrow 401) of only pole piece 11 of FIG. 1. This figure will be used to explain a first embodiment of the construction and arrangement of pole pieces 11 and 14 of FIG. 1, pole pieces 111 and 112 of FIG. 2, and shared pole piece 270 of FIG. 3.

FIG. 4 is an enlarged Air Bearing Surface (ABS) view that is taken in the direction indicated by arrow 401 of FIG. 1. FIG. 4 shows only the ABS view of FIG. 1's pole piece 11. However, FIG. 4 is an accurate showing of a first embodiment of the construction and arrangement of pole pieces 11 and 14 of FIG. 1, pole pieces 111 and 112 of FIG. 2, and pole piece 270 of FIG. 3.

Pole piece 11 is shown as having (1) a first or bottom magnetic metal layer 14, (2) a second or top magnetic metal layer 16, (3) an electrically insulating dielectric layer 15, and a plating seed layer 415. An important characteristic of layer 15 is that while it has a relatively high electrical impedance, it has a relatively low magnetic impedance because it is very thin, i.e. about 100 A in the X-direction.

Metal layers 14,16 are thin film layers, each having an exemplary X-direction thickness of about 20,000 angstroms. An exemplary Z-direction width of layers 14,16 is about 44 microns, top layer 16 being perhaps one or two microns smaller in this Z-direction than bottom layer 14. As will be appreciated, this Z-direction width is to be almost as wide as the pole is long in the Y-direction in order to minimize magnetic impedance.

Metal layers 14,16 are separated by a very thin, electrically nonconductive or insulating layer 15. An exemplary X-direction thickness of layer 15 is about 100 angstroms. Intermediate insulating layer 15 is preferably a very thin ceramic or a ceramic-like material, such as aluminum oxide ($Al_2O_3$). The top surface 416 of insulating layer 15 is coated with a plating seed layer 415, preferably NiFe, that accommodates the plating of top magnetic layer 16.

In the FIG. 4 embodiment of the invention, all vertical or X-direction side edges, such as the two side edges 402,403, of bottom magnetic layer 14 are covered with a relatively thick layer 400 of a hard baked photoresist. That is, photoresist 400 has been heated to a relatively high temperature, so as to convert photoresist 400 to a solid plastic state that cannot easily be removed, as photoresist is conventionally removed in known photolithographic processes.

The boarder or edge disposed hard baked photoresist member 400 covers a small Z-direction boarder portion 410 of the top surface 411 of bottom magnetic layer 14, thus leaving the major center portion of top surface 411 exposed. The X-direction thickness of this boarder portion 410 of hard baked photoresist 400 is very small; for example, about 1 micron thick.

In an alternative embodiment, insulating layer 15 may include a NiFe oxidized upper surface 411 of bottom NiFe magnetic layer 14 that has been oxidized in an oxygen plasma asher device prior to deposition of photoresist fringe 400 and plating seed layer 415.

In the construction and arrangement of FIG. 4, edge shorting or electrical short circuiting, for example edge 420 shorting to the underlying edge 402, does not occur during an ion beam etch manufacturing step (to be described) because edges 420,402 are protected or covered by hard baked photoresist member 400.

While the means whereby layers 14,15,415,16 are deposited or plated is not critical to this invention, an embodiment of the invention that includes providing a hard baked photoresist region 400 is as follows.

As a first step in the manufacture of pole piece 11 of FIG. 4, a sputter deposited sheet of NiFe (not shown) forms a first plating seed layer for the electro-deposition of the first NiFe magnetic layer 14. Then a photoresist mask or layer (not shown) is patterned onto the top of this first plating seed layer. This photoresist mask is patterned so as to facilitate the plating of NiFe, (for example 81% Ni, 19%) layer 14 to an X-direction thickness of about 20,000 A. As will be appreciated, a relatively large wafer 10 is usually used to facilitate the simultaneously manufacture of a number of thin film heads in accordance with this invention. This known aspect of head manufacture will not be described herein. As is conventional, the plating of NiFe layer 14 may include the use of current thief elements that operate to control plating current density.

After NiFe layer 14 has been plated, the above-described photoresist mask is stripped or removed, and the parts of the first plating seed layer that are thus exposed are removed by ion milling. Then, all generally vertically extending side edges of NiFe layer 14, such as the two side edge 402,403 that are shown in FIG. 4, are coated with a photoresist that will comprise an integral portion of the finished pole piece 11. This photoresist is now hard baked, to thereby cover and electrically isolate the side edges of NiFe layer 14 with hard baked photoresist member 400.

Alumina layer 15 is now coated, or sheet-deposited, onto both the top exposed surface 411 of NiFe layer 14, and onto the top surfaces 441 of hard baked resist member 400. Thereafter, a second plating seed layer 415, preferably NiFe, is sputter deposited on the top surface 416 of alumina layer 15.

A second photoresist mask (not shown) is now provided to enable the plating of the top NiFe layer 16 of pole piece 11 to an X-direction thickness of about 20,000 A. After NiFe layer 16 is plated, this second photoresist mask is striped.

Thereafter, ion beam etching or milling, as represented by arrows 480 in FIG. 4, operates to remove the exposed portions of second plating seed layer 415, and to trim and perfect the Y-Z planar shape of the top NiFe layer 16. An example is ion beam milling using argon atoms. As will be appreciated by those of skill in the art, ion milling 480 may take place at a number of different angles, and not only at the relatively normal angle that is shown in FIG. 4. This ion milling step will likely remove all, or a major portion of, the exposed second plating seed layer 415.

This ion milling material removal operation also generally uniformly removes a small portion of the upper surface of NiFe layer 16 and the small and exposed upper surface of alumina layer 15.

In the prior art, this last described ion milling step resulted in the removal of a small portion of the top magnetic metal layer 14, and the redepositing of this removed material as a shorting bridge across insulating layer 15 and as an electrical connection between metal layers 14 and 16. However, since hard baked photoresist member 400 operates to cover and isolate the side edges of NiFe layer 14, undesirable electrical short circuits do not occur between NiFe layer 14 and NiFe layer 16.

The two NiFe layers 14,16 now provide a laminated magnetic flux path for pole piece 11, the effective X-direction thickness of pole piece 11 being generally 40,000 A, and the four Y-Z plane surfaces of the two NiFe layers 14,16 providing a total of 28,000 A of effective skin depth at a head operating frequency of about 50 mega hertz.

Figure 5:
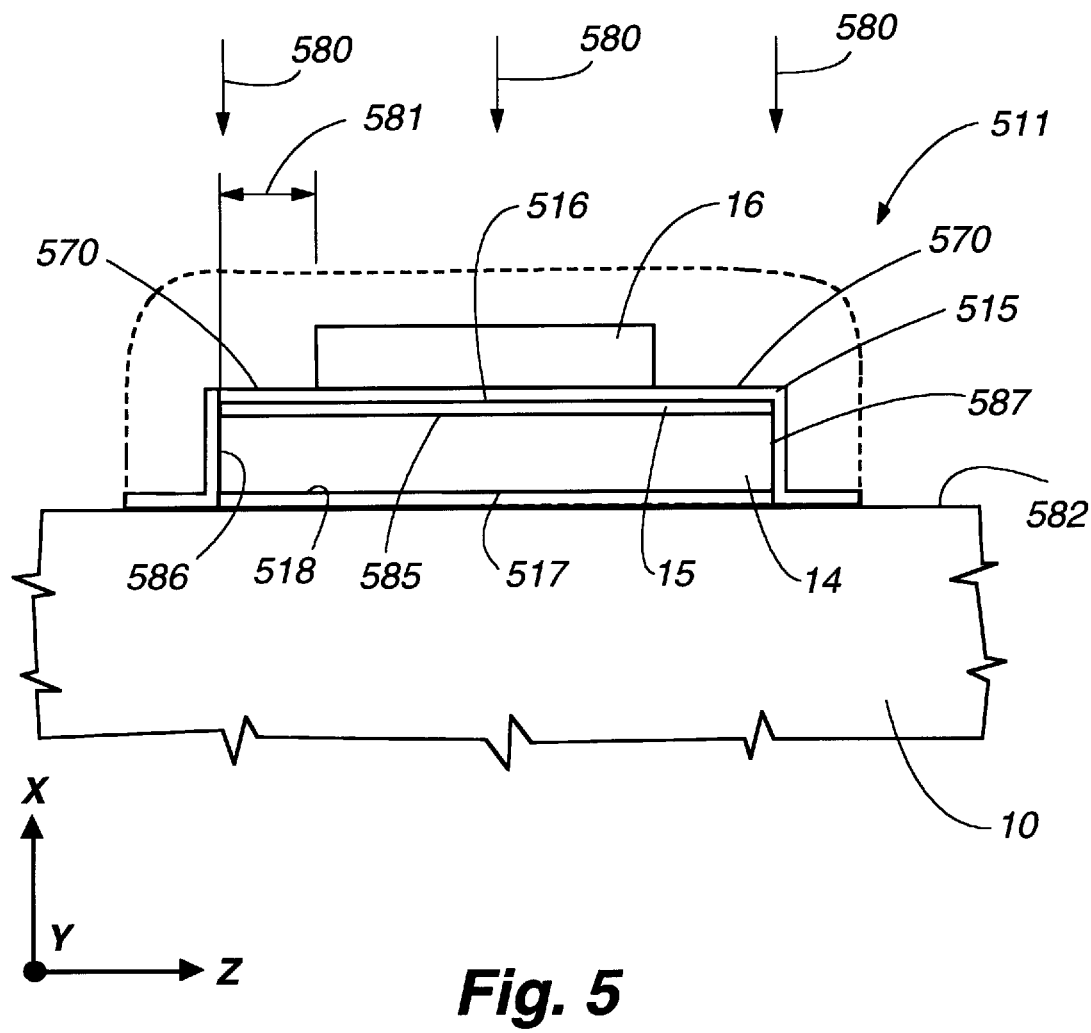
FIG. 5 is an enlarged Air Bearing Surface (ABS) view (see arrow 401) of only pole piece 11 of FIG. 1. This figure will be used to explain a second embodiment of the construction and arrangement of pole pieces 11 and 14 of FIG. 1, pole pieces 111 and 112 of FIG. 2, and shared pole piece 270 of FIG. 3.

FIG. 5 is an enlarged Air Bearing Surface (ABS) view of a pole piece 511 in accordance with another embodiment of this invention. FIG. 5 is taken in the direction indicated by arrow 401 in FIG. 1. FIG. 5 is an accurate showing of a second construction and arrangement of pole pieces 11 and 14 of FIG. 1, pole pieces 111 and 112 of FIG. 2, and pole piece 270 of FIG. 3.

In this second embodiment of the invention, the eddy current electrical circuit path between the two NiFe thin film pole piece laminations 14,16 is not totally blocked, as in the embodiment of FIG. 4. However the magnitude of any eddy current that may flow is reduced to a level whereat the advantageous effects of thin film laminated pole pieces remains.

The FIG. 5 embodiment of this invention is especially useful when the laminated thin film pole piece topography is not planar, as with laminated thin film pole piece 112 of FIG. 2.

In this embodiment of the invention, alumina layer 15 is deposited on the top surface 585 of the first or bottom NiFe thin film layer 14 in the absence of the photoresist boarder portion layer 400 that is shown in FIG. 4.

Pole piece 511 of FIG. 5 is shown as having (1) a first or bottom magnetic metal layer 14 of NiFe or Permalloy, (2) a second or top magnetic metal layer 16 of NiFe or Permalloy, (3) an insulating layer 15 of alumina, NiFe oxide, and/or ceramic on top of bottom NiFe layer 14, and (4) a plating seed layer 515 of NiFe or Permalloy on top of insulating layer 15.

NiFe layers 14,16 are thin film layers, each having an exemplary X-direction thickness of about 20,000 A. An exemplary X-direction thickness of alumina layer 15 is about 100 A. In this embodiment of the invention, bottom NiFe layer 14 is intentionally formed so as to have a Z-direction width that is significantly greater than the Z-direction width of the top NiFe layer 16. For example, layer 14 is about 44 microns wide, whereas layer 16 that is generally centered upon layer 14 is about 36 microns wide. As a result, about a 4 micron wide portion of layer 14 extends outward beyond each edge of layer 16, for example see distance 581 in FIG. 5. As will be apparent, this relatively long length 581 by which underlying portions of bottom NiFe layer 14 remain exposed is critical to the operation of this embodiment of this invention.

The top surface 516 of alumina insulating layer 15 carries a plating seed layer 515, preferably NiFe, that accommodates the plating or electro-deposition of top NiFe layer 16. As will be explained, in this embodiment of the invention, two thin and long residual portions or filaments 570 of NiFe plating seed layer 515 are allowed to short between top NiFe layer 16 and bottom NiFe layer 14. However, these residual filaments 570 of NiFe plating seed layer 515 are long enough in the Z-direction (see dimension 581) to provide an electrical resistance for filaments 570 that is much greater than the electrical resistance of NiFe thin film magnetic layers 14,16. Thus, eddy currents that attempt to flow in a circular manner in the plane of FIG. 5, and through the series circuit path 16,570,14,570,16, are reduced greatly in magnitude due to the high resistance of the two filament portions 570 of this current path.

While the means whereby the various layers of FIG. 5's pole piece 511 are deposited, or plated, is not critical to this invention, an embodiment thereof follows.

First, a plating seed layer or sheet 517 is sputter deposited onto the top surface 582 of substrate member 10. A first photoresist mask (not shown) is now patterned onto the top surface 518 of plating seed layer 517. This first photoresist mask is patterned so as to facilitate the plating or electro-deposition of NiFe, (for example, 81% Ni, 19%) layer 14 to an X-direction thickness of about 20,000 A. Again, a relatively large wafer 10 is usually used to facilitate the simultaneously manufacture of a number of thin film heads in accordance with this invention, and the plating of NiFe layer 14 may include the use of current thief elements that operate to control plating current density.

After NiFe layer 14 has been plated, the above-described first photoresist mask is striped or removed. Then, the non-plated regions of plating seed layer 517 (i.e. the regions that are not covered by layer 14) are removed by ion milling.

Alumina layer 15 is now sputter deposited onto the top exposed surface 585 of NiFe layer 14. A second plating seed layer 515 is thereafter sputter deposited on the top surface of alumina layer 15.

A second photoresist mask (not shown) is now provided to enable the plating of the top NiFe layer 16 of pole piece 511 to an X-direction thickness of about 20,000 A. After NiFe layer 16 is plated, this second photoresist mask is striped.

A third photoresist mask 590 is now placed over pole 511 as above formed. In FIG. 5, this third photoresist mask 590 is shown in dotted lines to indicate that mask 590 will be removed at a latter step in the process of making pole piece 511.

Thereafter, ion beam etching or milling, as represented by arrows 580 in FIG. 5, operates to remove all, or at least a major portion of, the exposed NiFe plating seed layer 515 that is not covered by photoresist mask 590. The remaining filament portions 570 of plating seed layer 515 each comprise long and thin NiFe filaments, or threads, that extend between and interconnect the two NiFe layers 14,16. For example, NiFe filaments 570 that are about 0.1 micro thick in the X-direction, and about 4.0 microns long in the Z-direction (see dimension 581). This third photoresist mask is then removed.

The two NiFe layers 14,16 now provide a laminated magnetic flux path for pole piece 511, the effective X-direction thickness of pole piece 511 being generally 40,000 A, and the four Y-Z plane surfaces of the two NiFe layers 14,16 providing a total of 28,000 A of effective skin depth at a head operating frequency of about 50 mega hertz.

The FIG. 5 embodiment of this invention does not totally block current flow between the two magnetic metal thin film layers 14,16, as is achieved in FIG. 4. However, the two NiFe filament portions 570 of FIG. 5's plating seed layer 515 are thin in the X-direction and long in the Z-direction. As a result, the electrical resistance of NiFe filament portions 570 is much greater than the electrical resistance of magnetic metal thin film layers 14,15. As a result of the relatively high electrical resistance of the two NiFe filaments 570, eddy currents of only a very low magnitude flow through the series circuit (CCW in FIG. 5) that comprises top NiFe layer 16, NiFe filament 570, edge 586 of bottom NiFe layer 14, bottom NiFe layer 14, edge 587 of bottom NiFe layer 14, and NiFe filament 570 back to NiFe layer 16.

Eddy currents that may flow through NiFe filaments 570 and between NiFe thin film layers 14,15 in the FIG. 5 embodiment of this invention, are therefore reduced in magnitude by a large factor from that which would be experienced in the case of a prior-art dead electrical short that existed between NiFe thin film layers 14,15 as a result of material redeposition during ion milling.

The criteria to establish this very low magnitude eddy current end result is expressed by the following relationship;

A times (B/C) is much greater than D times (E/F), where
A is the resistivity of plating seed layer 515,
B is the Z-direction length of plating seed filaments 570,
C is the X-direction thickness of plating seed filaments 570,
D is the resistivity of magnetic layers 14,16,
E is the Z-direction width of narrow top magnetic layers 16, and
F is the X-direction thickness of narrow top magnetic layer 116.

In the above equation, resistivity factors A and D are included to take into account the fact that electro-deposited thin film magnetic layers 14,16 may not be formed from the same type of magnetic material as is plating seed layer 515 that forms the two above described high resistance shorting filaments 570.

In the above description of the formation of laminated pole pieces in accordance with this invention, it has been described that a non-magnetic, electrically insulating $Al_2O_3$ layer is sputter-deposited on top of the bottom or first NiFe thin film layer, and a second magnetic plating seed layer of NiFe is then sputter-deposited on top of this $Al_2O_3$ layer.

While these two sputtering steps can be accomplished using two different sputtering machines, it is desired that these two sputtering operations take place sequentially within the same sputtering machine, and within the same vacuum pump down cycle of that machine, by sequentially moving a wafer from an $A_2O_3$ target to a NiFe target.

The present invention has been described in detail while making reference to preferred embodiments thereof. It is to be appreciated that those skill in this art will, upon learning of the present invention, readily visualize yet other embodiments that are within the spirit and scope of the invention. Thus, the forgoing detailed description is not to be taken as limiting the spirit and scope of the invention.

What is claimed is:

1. A data transducing head, comprising:
  a nonmagnetic and electrically nonconductive substrate member having a first surface;
  a first pole piece supported by said first surface, said first pole piece having a second surface;
  a nonmagnetic and electrically nonconductive gap member supported by said second surface, said gap member having a third surface;
  a transducing element within said gap member;
  a second pole piece supported by said third surface;
  at least one of said first and second pole pieces being a laminated thin film pole piece including:
    a first continuous thin film layer of magnetically permeable metal having a fourth surface and side edges extending from said fourth surface;
    a continuous, hard baked, photoresist member having:
      (i) a first portion that completely covers said side edges of said first thin film metal layer and (ii) a second portion that completely covers only border portions of said fourth surface that are adjacent to said side edges of said first thin film metal layer, said hard baked photoresist member operating to leave a center portion of said fourth surface uncovered of photoresist;
    a continuous thin film electrically insulating layer having a portion that completely covers said center portion of said fourth surface; and
    a second continuous thin film layer of magnetically permeable metal having a portion that coats said portion of said electrically insulating layer.

2. The data transducing head of claim 1 wherein said data transducing element is selected from the group MR element and inductive element.

3. The data transducing head of claim 2 wherein said transducing head operates at a frequency of about 50 mega hertz, and wherein said first and second continuous thin film metal layers each have a thickness, measured generally normal to said first surface, of about 20,000 A.

4. The data transducing head of claim 3 wherein said electrically insulating layer has a thickness, measured generally normal to said first surface, of about 100 A.

5. The data transducing head of claim 4 wherein said first and second continuous thin film metal layers are NiFe, and wherein said electrically insulating layer is alumina.

6. The data transducing head of claim 5 wherein said second thin film NiFe layer is an electro-deposited layer, and including:
- a NiFe plating seed layer intermediate said second thin film NiFe layer and said portion of said electrically insulating layer.

7. A data transducing head, comprising:
- a nonmagnetic and electrically nonconductive substrate member having a first surface;
- a first pole piece supported by said first surface, said first pole piece having a second surface;
- a nonmagnetic and electrically nonconductive gap member supported by said second surface, said gap member having a third surface;
- a transducing element within said gap member;
- a second pole piece supported by said third surface;
- at least one of said first and second pole pieces being a laminated thin film pole piece including:
  - a first continuous thin film metal layer of a magnetically permeable metal having a thickness of about 20,000 A, said first thin film layer having a fourth surface;
  - a continuous thin film electrically insulating layer coating said fourth surface, said electrically insulating layer having a fifth surface;
  - a plating seed layer coating said fifth surface and side edges of said first thin film layer, said plating seed layer having a thickness of about 0.1 micron and border portions having a width of about 4.0 A; and
  - a second thin film metal layer of a magnetically permeable metal having a thickness of about 20,000 A, said second thin film metal layer being electro-deposited on said plating seed layer exclusive of said border portions.

8. The data transducing head of claim 7 wherein said data transducing element is selected from the group MR element and inductive element.

9. The data transducing head of claim 8 wherein said first and second thin film metal layers are NiFe, wherein said plating seed layer is NiFe, and wherein said electrically insulating layer is selected from the group an oxide of NiFe, a ceramic, and alumina.

10. A read/write data transducing head, comprising:
- a nonmagnetic and electrically nonconductive substrate member, said substrate member having a first surface;
- a first pole piece supported by said first surface, said first pole piece having a second surface;
- a first nonmagnetic and electrically nonconductive gap member supported by said second surface, said first gap member having a third surface;
- an MR element within said first gap member;
- a second pole piece supported by said third surface, said second pole piece having a fourth surface;
- a second nonmagnetic and electrically nonconductive gap member supported by said fourth surface, said second gap member having a fifth surface;
- a write coil within said second gap member;
- a third pole piece supported by said fifth surface;
- one or more of said first, second and third pole pieces being a laminated thin film pole piece including:
  - a first continuous thin film metal layer of a magnetically permeable metal having a thickness of about 20,000 A, said first thin film layer having a sixth surface;
  - a continuous thin film electrically insulating layer completely coating said sixth surface, said electrically insulating layer having a continuous seventh surface;
  - a plating seed layer completely coating said seventh surface and side edges of said first thin film metal layer, said plating seed layer having an eighth surface, said plating seed layer having thickness of about 0.01 micron and border portions having a width of about 4.0 A;
  - a second thin film metal layer of a magnetically permeable metal having a thickness of about 20,000 A, said second thin film metal layer being electro-deposited only on a generally center portion of said eighth surface.

11. The read/write data transducing head of claim 10 wherein said first and second thin film metal layers are NiFe, wherein said plating seed layer is NlFe, and wherein said electrically insulating layer is selected from the group NlFe oxide, ceramic and alumina.

12. A read/write data transducing head, comprising:
- a nonmagnetic and electrically nonconductive substrate member having a first surface;
- a first pole piece supported by said first surface, said first pole piece having a second surface;
- a first nonmagnetic and electrically nonconductive gap member supported by said second surface, said first gap member having a third surface;
- an MR element within said first gap member;
- a second pole piece supported by said third surface, said second pole piece having a fourth surface;
- a second nonmagnetic and electrically nonconductive gap member supported by said fourth surface, said second gap member having a fifth surface;
- a write coil within said said gap member;
- a third pole piece supported by said fifth surface;
- one or more of said first, second and third pole pieces being thin film laminated comprising:
  - a first continuous thin film layer of magnetically permeable metal having a sixth surface and side edges extending downward from said sixth surface;
  - a continuous, hard baked, photoresist member having: (i) a first portion that completely covers said side edges of said first thin film metal layer and (ii) a second portion that completely covers only border portions of said sixth surface that are adjacent to said side edges of said first thin film metal layer, said hard baked photoresist member operating to leave a center portion of said sixth surface uncovered of hard baked photoresist;
  - a continuous thin film insulating layer having a first portion that completely covers said center portion of said sixth surface and a second portion that covers said second portion of said hard baked photoresist member;

a second continuous thin film layer of magnetically permeable metal having a first portion that coats said first portion of said insulating layer and a second portion that coats said second portion of said insulating layer.

13. The read/write data transducing head of claim 12 wherein said head operates at a frequency of about 50 mega hertz, and wherein said first and second continuous thin film metal layers each have a thickness, measured generally normal to said sixth surface, of about 20,000 A.

14. The read/write data transducing head of claim 13 wherein said insulating layer has a thickness, measured generally normal to said sixth surface, of about 100 A.

15. The read/write data transducing head of claim 14 wherein said first and second continuous thin film metal layers are NiFe, and wherein said insulating layer comprises one or more of the group NiFe oxide, ceramic, and alumina.

* * * * *